United States Patent [19]

Skala

[11] 4,276,145
[45] Jun. 30, 1981

[54] ELECTROLYTIC ANOLYTE DEHYDRATION OF CASTNER CELLS

[76] Inventor: Stephen F. Skala, 3839 S. Wenonah Ave., Berwyn, Ill. 60402

[21] Appl. No.: 117,240

[22] Filed: Jan. 31, 1980

[51] Int. Cl.³ .......................... C25B 1/04; C25B 9/00
[52] U.S. Cl. .................................. 204/247; 204/245; 204/246
[58] Field of Search ................... 204/60, 129, DIG. 4, 204/245, 246, 247, 130

[56] References Cited

U.S. PATENT DOCUMENTS

| | | | |
|---|---|---|---|
| 1,126,627 | 1/1915 | Gaus | 204/266 |
| 3,242,059 | 3/1966 | Cottam et al. | 204/98 |
| 3,600,228 | 8/1971 | La Conti | 204/DIG. 4 |
| 4,062,753 | 12/1977 | Falvo | 204/266 |

Primary Examiner—R. L. Andrews

[57] ABSTRACT

A Castner type electrolysis cell, operating to produce alkali metal from molten alkali hydroxide, forms water at its anode which dissolves in surrounding anolyte. Normally, the water is itself electrolyzed and consumes as much electrical current at the Castner cell operating voltage as does production of the alkali metal. Since water has a substantially lower decomposition voltage than alkali metal, electrolysis of water in the Castner cell represents unrecoverable energy loss.

This invention improves energy efficiency of alkali hydroxide electrolysis by electrolyzing the formed water at a lower voltage to produce hydrogen and oxygen and by reacting the hydrogen and oxygen electrochemically to recover a portion of the electrical energy used for the electrolysis of water. An anolyte electrolytic dehydrator, which is a cell designed for electrolysis of water in molten alkali hydroxide, receives anolyte from the Castner cell and dehydrates the anolyte by electrolysis for return to the Castner cell. The hydrogen and oxygen produced by electrolysis of water in the anolyte are delivered to a fuel cell. Electrical energy produced by the fuel cell is processed for transfer to the Castner cell and to the anolyte electrolytic dehydrator to reduce net use of energy for alkali hydroxide electrolysis.

In a preferred system, the anolyte is drawn through a porous anode so that water is removed from the Castner cell as it is formed to reduce its concentration in the anolyte and its concentration gradient at the anode. Dehydrated anolyte is returned to the Castner cell through a diaphragm assembly to reduce diffusion of alkali metal into the anolyte.

3 Claims, 4 Drawing Figures

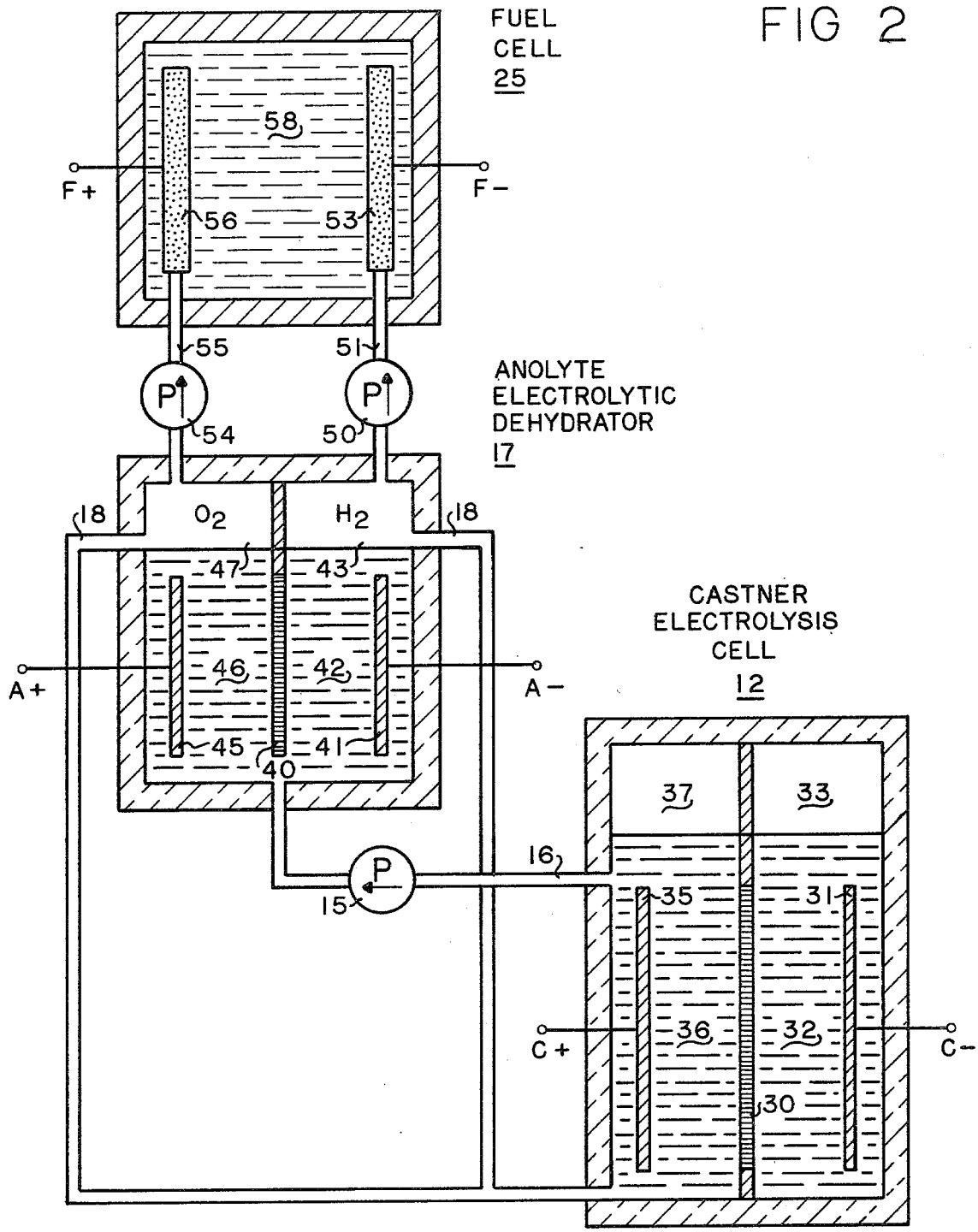

ELECTROLYTIC ANOLYTE DEHYDRATION OF CASTNER CELLS

BACKGROUND

1. Field of the Invention

This invention relates to electrolysis of molten alkali hydroxide to produce alkali metal and more particularly it relates to apparatus for improving energy efficiency by anolyte dehydration.

Electrolysis of molten sodium chloride has replaced electrolysis of molten sodium hydroxide as a principal source of sodium metal. Sodium chloride is the principal sodium mineral and a high current efficiency results from insolubility of gaseous chlorine in the anolyte. Yet energy efficient electrolysis of molten sodium hydroxide as an alternative source of sodium metal has the following advantages:
  sodium hydroxide is co-produced with hydrochloric acid in large commercial quantities by electrolysis of aqueous sodium chloride solutions but present demand for the sodium hydroxide tends to be less than for the hydrochloric acid;
  the decomposition potential of sodium hydroxide is substantially lower for a thermodynamic advantage; and
  sodium hydroxide is less corrosive and has a lower melting temperature for processing advantages.

Another field of application for the invention is reduction of a sodium-potassium hydroxide mixture in a cyclic secondary energy system wherein the eutectic alloy of sodium and potassium called NaK is a liquid fuel for automobiles as disclosed in U.S. Pat. Nos. 3,911,284 and 3,911,288 issued to the applicant. In this energy system, NaK metal reacts with water and atmospheric oxygen is automobile engines to provide mechanical power. NaK hydroxide, which is formed as a reaction product, is exchanged for Nak metal during a fuel stop. Electrolytic reduction, recycled fuel material, and nuclear or renewable primary energy sources provide an automotive system which is environmentally benign and, particularly, does not contribute to atmospheric carbon dioxide with its potentially adverse effects upon climate.

2. Prior Art

A commercial electrolysis cell for producing alkali metal from molten alkali hydroxide was disclosed by H. Y. Castner in U.S. Pat. No. 452,030 (1891). Castner's cell comprises an iron or nickel anode and cathode immersed in molten electrolyte and separated into an anolyte portion and a catholyte portion by a diaphragm such as a nickel screen or wire gauze. The basic reaction is:

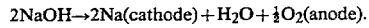
2NaOH→2Na(cathode)+H$_2$O+½O$_2$(anode).

The sodium metal dissolves in the catholyte, the water dissolves in the anolyte, and the oxygen is substantially insoluble. The dissolved water is electrolyzed so that the overall electrolysis of the 2NaOH is:

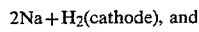
2Na+H$_2$(cathode), and

O$_2$(anode).

Since half of the current is expended to electrolyze formed water, the basic Castner cell is limited to a current efficiency of 50%. Some of the sodium may diffuse to the anode and react with the forming water to form NaOH and hydrogen which reduces sodium metal yield and further decreases current efficiency. Castner's improvements, which included the diaphragm to prevent convective interactions of water in the anolyte with sodium in the catholyte and further included operation near the electrolyte melting temperature to reduce diffusion of sodium metal, made early commercial use feasible but did not overcome inefficiencies resulting from formed water dissolved in the anolyte.

Although stable hydrates of sodium hydroxide do not exist above 145° C., direct thermal dehydration is difficult. At the 320° C. melting point of sodium hydroxide, water content is reduced to only about 10%. With a temperature of 360° C. at a reduced pressure of 500 mm. Hg, a 1% water content is expected. Commercially anhydrous levels are attained at 500° C. in open pots. Sodium hydroxide can be dehydrated by azeotropic distillation with kerosene at 220° C. But the various thermal processes for dehydrating sodium hydroxide are either not sufficiently effective or incompatible with operating conditions within Castner cells.

One method for use within Castner cells for reducing anolyte water content is based on additives which reduce water solubility or which react with the water. Sodium iodide is an example of the first and sodium amide of the second. Sodium amide and water form ammonia and sodium hydroxide. Additives, however, tend to increase process complexity and have not been successful.

Another method for reducing anolyte water content is described by F. J. Dobrovolny in "Official Gazette" 1950, Vol. 637, pages 1575-6. The anolyte is circulated through a heating zone where it is flushed with an inert gas to remove water vapor. Current efficiency of the Castner cell is improved but such thermal dehydration is not energy efficient at the high flow rate of sodium hydroxide needed to maintain low levels of water in the anolyte.

OBJECTS AND SUMMARY

It is a general object of the invention to provide an improved system for producing alkali metal from molten alkali hydroxide by electrolysis.

It is a more particular object to provide an energy efficient system for maintaining Castner cell anolyte at a low level of water content.

These and other objects and advantages are attained according to the invention wherein water dissolved in the anolyte of an operating Castner cell is decomposed by electrolysis into hydrogen and oxygen at a voltage lower than the decomposition voltage of alkali hydroxide. The hydrogen and oxygen react electrochemically to generate electrical energy. Energy efficiency is improved by reducing water reactions in the Castner cell and by recovering a portion of the energy used to remove the water.

The anolyte, with the dissolved water, is transported from the Castner cell to an anolyte electrolytic dehydrator which is an electrolysis cell operated at a voltage which is sufficient to decompose the water into hydrogen and oxygen but is not sufficient to decompose the alkali hydroxide. The dehydrated anolyte is transported back to the Castner cell for further electrolysis and the hydrogen and oxygen are transported to a fuel cell for reaction to generate electrical energy which is used by the Castner cell and by the anolyte electrolytic dehydrator. The system comprising a fuel cell and an anolyte electrolytic dehydrator provides an energy efficient and effective means for removing water from Castner cell anolyte to improve energy efficiency of the Castner cell. The water removed from the anolyte is not decomposed wastefully at the higher operating voltage of the Castner cell. Further, since reaction rate of diffusing reaction products is proportional to their concentrations, removal of the water increases alkali metal yield which also increases energy efficiency.

A preferred system for transporting electrolyte from an electrolysis cell for depletion of products of decomposition includes a porous electrode through which the electrolyte is drawn. The electrolyte flowing through the electrode removes products of decomposition from the electrolysis cell as they are formed. Concentration gradients of the products of decomposition at the electrode are substantially reduced to improve voltage efficiency as are their overall concentrations which improves yield. A preferred system for returning depleted electrolyte to the electrolysis cell includes a diaphragm assembly having a pair of diaphragms separated by the returning electrolyte under pressure so that the electrolyte flows outward into both anolyte and catholyte thereby providing a positive flow which opposes diffusion of decomposition products toward each other to preclude parasitic reactions and reduced yield.

In a more general embodiment, an electrolyzable impurity is removed from an electrolyte which has a substantially higher decomposition voltage than the impurity. The impurity is decomposed by electrolysis at a voltage which does not decompose the electrolyte to form decomposition products which are subsequently reacted in a fuel cell to generate electrical energy thereby partly compensating for the electrical energy consumed by their decomposition.

BRIEF DESCRIPTION OF THE DRAWINGS

FIG. 2 is a schematic drawing showing electrochemical portions of the system of the invention in more detail.

DESCRIPTION OF THE PREFERRED EMBODIMENTS

Figure 1:
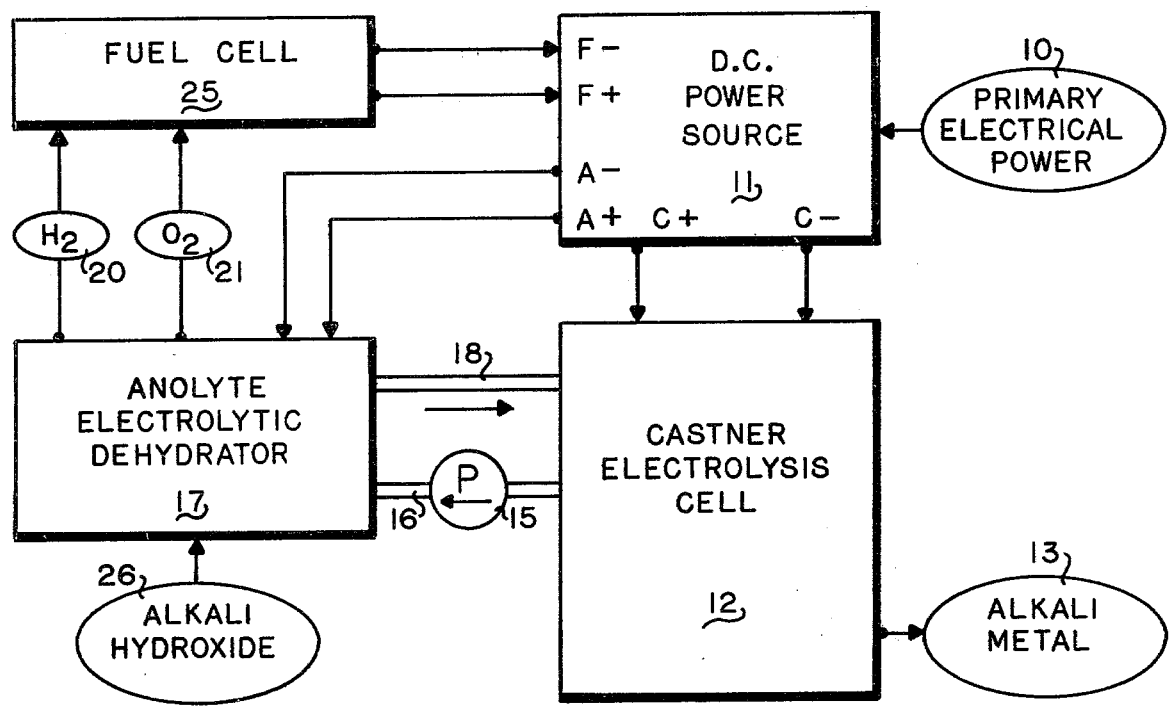
FIG. 1 is a diagrammatic drawing showing the system of the invention wherein anolyte from a Castner cell is dehydrated by electrolysis to produce hydrogen and oxygen which react in a fuel cell to generate electrical energy for use by the system.

FIG. 1 shows the system of the invention wherein anolyte from a Castner cell is dehydrated by electrolysis in an anolyte electrolytic dehydrator to produce hydrogen and oxygen which react in a fuel cell to generate electrical energy which is used by the system.

Primary electrical power 10 from utility lines is transformed to an appropriate lower voltage and rectified to a direct current by D.C. power source 11. The D.C. power source includes terminals C+ and C− which connect to a Castner type alkali hydroxide electrolysis cell which produces alkali metal 13.

As the Castner cell operates, water formed as a decomposition product in an anolyte portion, not shown, and dissolved in molten alkali hydroxide is circulated in a fluid circuit which includes pump 15 in supply conduit 16, an anolyte electrolytic dehydrator 17, and a return conduit 18. The anolyte electrolytic dehydrator is an electrolysis cell which receives electrical power from terminals A+ and A− of the D.C. power source at a voltage sufficient to decompose water but not alkali hydroxide. The lower decomposition voltage of water allows its electrolysis in the anolyte electrolytic dehydrator with less energy than otherwise would be expended in the Castner cell to decompose the same amount of water. Hydrogen 20 and oxygen 21, formed as decomposition products of the water, are transported to hydrogen-oxygen fuel cell 25 to generate electrical energy which is received by the D.C. power source at terminals F+ and F−. This electrical energy is transformed by known inverter and rectifier means to appropriate voltages for use by the Castner cell and the anolyte electrolytic dehydrator.

Molten alkali hydroxide 26 for make-up to replace electrolyzed alkali hydroxide passes through the anolyte electrolytic dehydrator before delivery to the Castner cell. The water content of sodium hydroxide dried only by heating to its melting temperature is about 10%.

The term "alkali metal" includes sodium, potassium, and their mixtures which are sufficiently similar to be represented by any one species, such as sodium. The hydroxides of sodium, potassium, and various alloys have been reduced to corresponding metals in Castner type cells. Alkali hydroxide mixtures have lower melting points, with a minimum of 170° C. for equimolar mixture, which is an advantage for design and operation of electrolysis cells.

FIG. 2 describes a Castner cell, an anolyte dehydrator, and a fuel cell having the following representative characteristics:

| component | reaction | reversible voltage | temperature |
|---|---|---|---|
| Castner cell | $2Na \rightarrow 2Na + \frac{1}{2}O_2 + H_2O$ | 2.32 | 325° C. |
| Anolyte dehydrator | $H_2O \rightarrow H_2 + \frac{1}{2}O_2$ | 1.07 | 325° C. |
| Fuel cell | $H_2 + \frac{1}{2}O_2 \rightarrow H_2O$ | 1.23 | 50° C. |

The theoretical current for each of the components is the same. The reversible voltage of the Castner cell is based on reported data. The reversible voltages of the anolyte dehydrator and the fuel cell are computed from thermodynamic properties of water at the indicated temperatures. The reversible voltages show that an adequate margin exists between the decomposition voltage of alkali hydroxide and of water to allow electrolysis of the water but not of the alkali hydroxide. A moderate temperature fuel cell has a lower reversible voltage than the hot anolyte dehydrator which is desirable for conservation of electrical energy. A typical Castner cell operates in a range of 3.5 to 4.5 volts where the difference between reversible and operating voltages is substantially ohmic loss across the electrolyte.

Castner cell 12 is separated by diaphragm 30 into a catholyte portion and an anolyte portion. The catholyte portion includes cathode 31 connected to terminal C− of the D.C. power source shown in FIG. 1 and catholyte 32 comprising molten alkali hydroxide having an alkali metal component from the cathode reaction. Alkali metal dissolves in alkali hydroxide to a saturation level after which it condenses. The condensed alkali metal has a lower density than the alkali hydroxide and rises into chamber 33 from which it can be removed. Alkali hydroxide adheres to most materials and flows through small openings whereas alkali metal does not so adhere thereby allowing separation and removal by perforated ladles or screens. The anolyte portion comprises anode 35 connected to terminal C+, an anolyte 36 comprising molten alkali hydroxide with accumulated water, and a chamber 37 to collect oxygen which is normally formed at the anode for removal through an opening not shown.

Anolyte dehydrator 17 has structural similarities with a Castner cell in that it similarly divides molten alkali hydroxide electrolyte into an anolyte and a catholyte portion by a diaphragm, but its differences from the Castner cell include operation at a lower voltage, reaction products consisting substantially of hydrogen and oxygen, and a substantial identity of anolyte and catholyte. Diaphragm 40 is fabricated from a suitable porous material such as a nickel screen or wire gauze and functions to preclude mixing of hydrogen and oxygen which are present in gaseous phases. A catholyte portion comprises cathode 41 connected to terminal A−, catholyte 42, and chamber 43 which receives the hydrogen gas formed at the cathode. An anolyte portion comprises anode 45 connected to terminal A+, anolyte 46, and chamber 47 which receives oxygen gas formed at the anode. The catholyte 42 and anolyte 46 enter the anolyte dehydrator as a single homogeneous substance and do not accumulate reaction products since the hydrogen and oxygen gases are substantially insoluble in the molten electrolyte while alkali metal and water are not formed since the anolyte dehydrator is operated below voltages at which significant electrolysis of the alkali hydroxide could occur.

As the Castner cell operates to form water at its anode which accumulates in anolyte 36, pump 15 operates to circulate the anolyte 36 through supply conduit 16, through the anolyte dehydrator, and through return conduits 18 back into the Castner cell. Water dissolved in flowing catholyte 42 and anolyte 46 is substantially decomposed into hydrogen and oxygen and thereby removed so that the anolyte entering the Castner cell from conduit 18 is in a dehydrated state.

Fuel cell 25 receives hydrogen and oxygen from the anolyte dehydrator for recovery of available energy from water formation. Hydrogen-oxygen fuel cells are well known and the fuel cell 25 is representative. A pump 50 and conduit 51 deliver hydrogen under pressure from chamber 43 to cathode 53. Similary, pump 54 and conduit 55 deliver oxygen from chamber 47 to anode 56. A preferred fuel cell type suitable for pure hydrogen and oxygen has the cathode 53 and anode 56 fabricated of porous nickel which allows gas to pass under pressure and provides a catalyst for ionization of the gases. Electrolyte 58 is an aqueous solution of potassium hydroxide. Electrical energy is generated as water is formed and is transmitted through terminals F+ and F−. The formed water is removed from the electrolyte by vaporization and the electrolyte is cooled to fuel cell operating temperature in an external loop, not shown.

The fuel cell ideally generates at least as much energy as is consumed by the anolyte dehydrator. Although ohmic losses result in a net energy input, the fuel cell's contribution is substantial.

Figure 3:
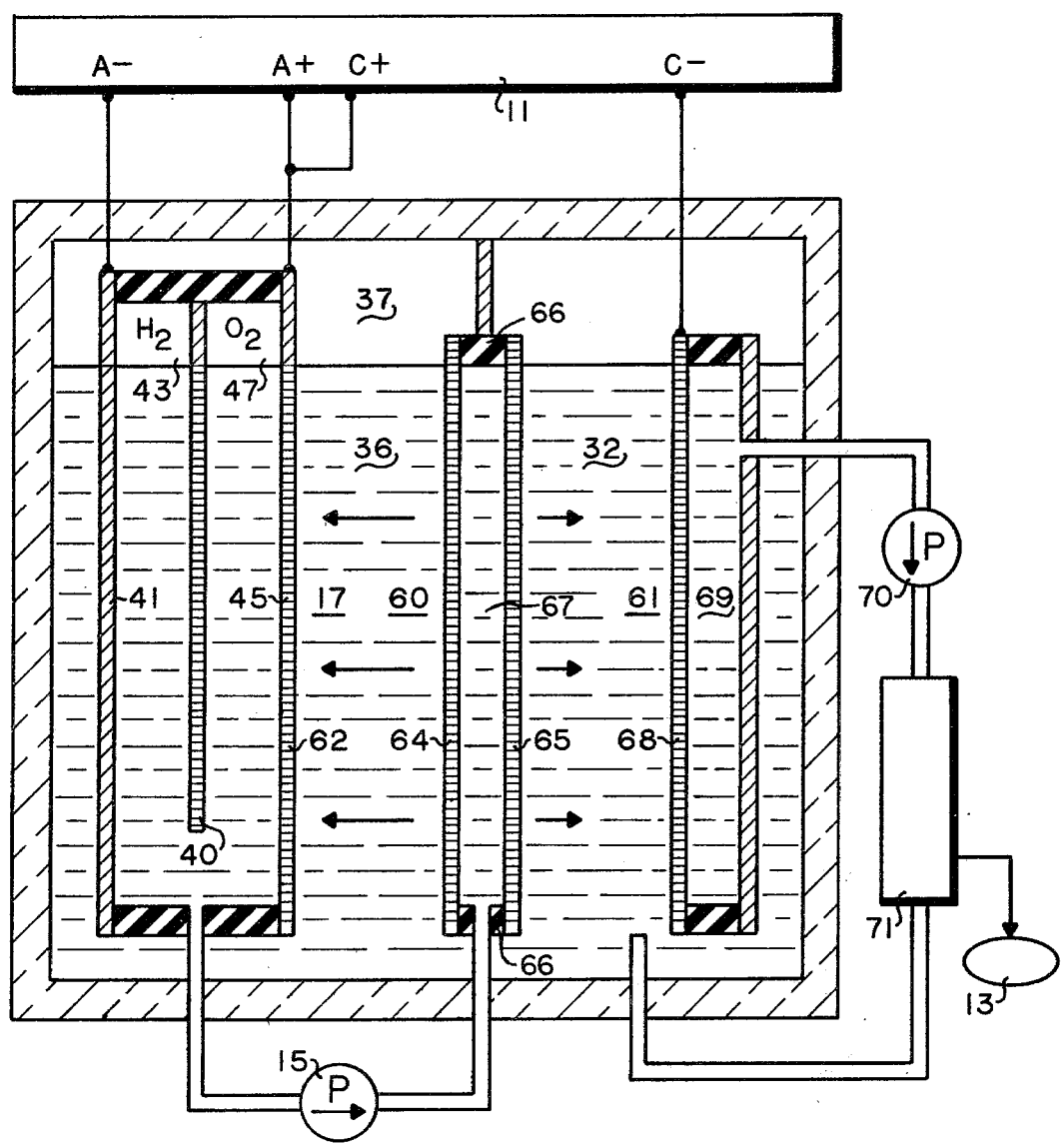
FIG. 3 is a schematic drawing of a Castner cell having permeable electrodes to draw electrolyte from the cell for depletion of decomposition products and having a diaphragm assembly to return dehydrated anolyte to the Castner cell.

FIG. 3 shows an electrolysis cell having porous electrodes through which electrolyte containing products of decomposition can flow for removal of the products of decomposition and return of depleted electrolyte to the body of electrolyte in the electrolysis cell. As water is formed at the anode of a Castner cell, it is drawn into an anolyte electrolytic dehydrator where it is removed from alkali hydroxide by electrolysis. The dehydrated alkali hydroxide is pumped back into the Castner cell through a diaphragm assembly which assures isolation of the products of decomposition to improve energy efficiency of the Castner cell. Catholyte which contains alkali metal is also drawn through a porous cathode for depletion of the alkali metal.

A Castner cell is divided by a diaphragm assembly 60 into an anolyte portion and a catholyte portion. The catholyte portion comprises catholyte 32 and a cathode assembly 61 which includes a cathode 68 connecting to terminal C− of power source 11. The anolyte portion comprises anolyte 36 and an anolyte electrolytic dehydrator 17 which includes an anode 62 connecting to terminal C+ of the power source. The voltage between C+ and C− is sufficient to decompose alkali hydroxide into alkali metal at the cathode and into water and oxygen at the anode. Alkali metal and water are soluble in alkali hydroxide while the oxygen is able to rise into chamber 37 for removal from the Castner cell.

The anolyte electrolytic dehydrator 17 functions as described with reference to FIG. 2 and comprises a diaphragm 40, a cathode 41 connected to terminal A−, a chamber 43 which receives hydrogen gas, an anode 62 connected to terminal A+, and a chamber 47 which receives oxygen gas. The anode 62, which is common to the Castner cell and the anolyte electrolytic dehydrator, is a porous or perforated sheet through which anolyte from the Castner cell can flow. As pump 15 operates, alkali hydroxide flows in a path which includes the anolyte electrolytic dehydrator 17 and the diaphragm assembly 60.

The diaphragm assembly 60 comprises anolyte diaphragm 64 and catholyte diaphragm 65 which are porous or perforated sheets separated by impervious separators 66 to form an enclosure 67 into which electrolyte is pumped for flow through the anolyte and catholyte diaphragms. Water forming at anode 62 is drawn therethrough by flowing alkali hydroxide. Concentration of water at the Castner cell side of the anode and its diffusion into the body of electrolyte in the Castner cell is reduced to a low level.

In the catholyte portion of the Castner cell, a portion of the dehydrated alkali hydroxide from the diaphragm assembly 60 flows through porous catholyte diaphragm 65 in sufficient quantity for make-up of electrolyte consumed in electrolysis. Flow rate is predetermined and means, not shown, are provided for withdrawl of excess catholyte. The flow of alkali hydroxide from the catholyte diaphragm 65 prevents diffusion of alkali metal into the anolyte portion of the Castner cell to further improve yield and energy efficiency. The cathode assembly 61 with pump 70 and alkali metal separator 71 operate to reduce concentrations and concentration gradients of alkali metal in the catholyte of the Castner cell. Alkali hydroxide is drawn through cathode 68, which is a porous or perforated sheet, to transport dissolved alkali metal formed at the cathode into chamber 69, and to the alkali metal separator 71. The alkali metal separator is based on any of several known principles for producing separate phases of alkali metal and hydroxide which include heating to reduce solubility of alkali metal in its hydroxide, distilling by vaporizing the lower boiling alkali metal, and scrubbing of the alkali hydroxide with mercury, lead, or other substances in which the alkali metal is readily soluble for subsequent separation of the alkali metal. Alkali hydroxide depleted of alkali metal is returned to the catholyte portion of the Castner cell through return conduit 72 and alkali metal is transported to a collector represented by 13.

Figure 4:
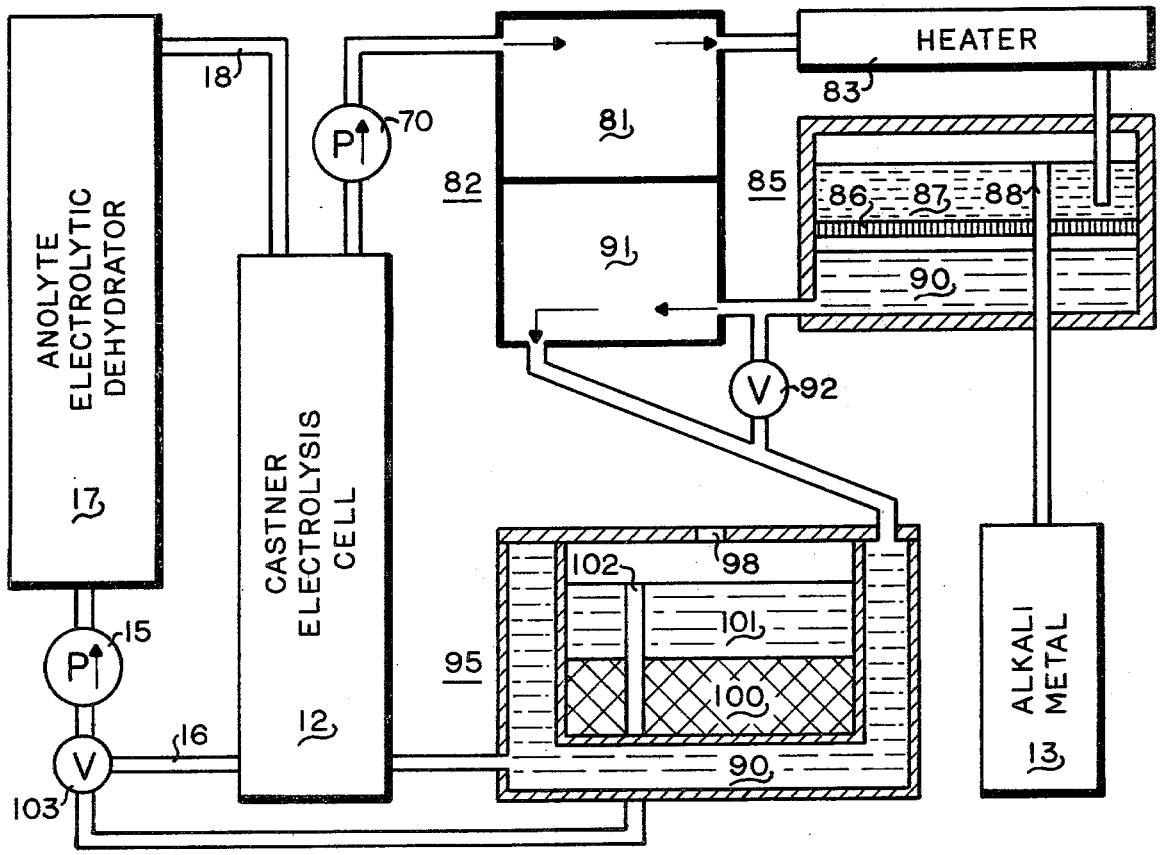
FIG. 4 is a diagrammatic and schematic drawing showing a system for depleting catholyte of alkali metal and for melting make-up alkali hydroxide for dehydration and delivery to the Castner cell.

FIG. 4 is a schematic drawing of a catholyte alkali metal separator combined with a make-up alkali hydroxide heater, both of which further contribute to system efficiency.

Parasitic reaction rates between water and alkali metal formed in the Castner cell is proportional to the product of their concentration in the electrolyte. Thus removal of alkali metal from the catholyte to less than saturation level would contribute to current efficiency. Solubility of alkali metal in its molten hydroxide decreases with increasing temperature so that alkali metal removal at a higher temperature is more effective. The catholyte is circulated in a fluid circuit which includes the Castner cell, a catholyte heater and separator zone to remove alkali metal at a high temperature, and means to exchange heat between catholyte entering and leaving the catholyte heater and separator and between catholyte and make-up electrolyte to conserve thermal energy. Catholyte reentering the Castner cell is then near its melting temperature for operating efficiency according to Castner.

As Castner electrolysis cell 12 operates, alkali metal accumulates in the catholyte. The catholyte flows in response to a differential pressure developed by pump 70, through a conduit, a first portion 81 of heat exchanger 82, and a heater 83 where the catholyte is heated by any suitable thermal source. As catholyte temperature increases, alkali metal solubility decreases so that condensation and phase separation occur to form metal globules. The mixture of alkali metal and hydroxide flows into catholyte separator 85. Separation of alkali metal and hydroxide occurs at screen 86. Alkali hydroxide readily wets the screen and passes through its small orifices while alkali metal does not wet the screen and is prevented from flowing through by surface tension. The screen may be a perforated nickel sheet or wire gauze. The separated alkali metal 87 flows through standpipe 88 into alkali metal collector 13. Partially depleted alkali hydroxide 90, which is at a temperature too high for operation in the Castner cell, transfers its excess heat either to the catholyte entering the heater or to make-up alkali hydroxide. The alkali hydroxide 90 flows through a second portion 91 of heat exchanger 82 or through by-pass valve 92 into a make-up alkali hydroxide heater 95. By-pass valve 92 is controlled to provide sufficient heat to the make-up heater 95 while the catholyte heater 83 maintains at a constant temperature the alkali hydroxide entering catholyte separator 85. The make-up heater 95 is a heat exchanger having a double walled structure between which alkali hydroxide 90 flows toward the Castner cell. Make-up alkali hydroxide is metered through an opening 98 by such means as a screw feeder, not shown. As solid phase alkali hydroxide 100 fuses into a liquid phase it flows through standpipe 102 into selector valve 103 for delivery by pump 15 into anolyte electrolytic dehydrator 17 as required to maintain a predetermined level of electrolyte within the Castner cell.

Alkali hydroxide has two properties which tend to stabilize its temperature near its melting point in the make-up heater 95. It has a large latent heat of fusion for a large het capacity and any alkali hydroxide which may freeze within the double wall functions as a thermal insulator to decrease heat flow and further cooling. If such freezing occurs, as indicated by a low temperature or a reduced flow, the by-pass valve 92 opens for increased heat to the make-up heater 95.

ALTERNATIVE EMBODIMENTS

The process of the invention wherein water is electrolyzed at a lower voltage to form hydrogen and oxygen for subsequent reaction in a fuel cell may also be practiced within a Castner cell by alternating between a higher voltage phase for electrolysis of alkali hydroxide and a lower voltage phase for electrolysis only of water. The lower voltage is applied until the anolyte is substantially dehydrated as indicated by a current drop at the lower voltage as conduction by hydrogen and hydroxyl ions is reduced by depletion. Although this embodiment provides a more simple system over the preferred embodiment having a separate anolyte dehydrator, it has disadvantages which include a period of nonoperation during anolyte dehydration which represents lost production and during which alkali metal continues to diffuse into the anolyte where it reacts with water to reduce yield and which also include reduced efficiencies due to inconsistent design requirements.

The invention has a more general embodiment wherein an impurity having a substantially lower decomposition voltage than a solvent electrolyte is removed from the electrolyte by electrolysis and the decomposition products react in a fuel cell to generate electrical energy. An example is sodium hydroxide as an impurity in molten sodium chloride which is decomposed at the lower voltage into sodium metal at the cathode and oxygen and water at the anode, both of which separate from the anolyte as gases. The oxygen and a stoichiometric portion of the sodium are transported to a fuel cell. A typical sodium-oxygen fuel cell has a sodium amalgam cathode, an aqueous sodium hydroxide electrolyte, and an oxygen anode.

What I claim is:

1. A system for dehydrating molten alkali hydroxide anolyte comprising
   a Castner cell having an anolyte portion wherein water is formed,
   an anolyte electrolytic dehydrator for electrolytically decomposing water in the anolyte to hydrogen and oxygen and having a chamber to collect the hydrogen and a chamber to collect the oxygen,
   conduits and pumping means to transport the anolyte in a path with includes the Castner cell and the anolyte electrolytic dehydrator, and
   a power source having one output to provide a higher voltage for the Castner cell to produce alkali metal and having another output to provide a lower voltage for the anolyte electrolytic dehydrator to decompose the water but not sufficient to decompose the alkali hydroxide.

2. The system of claim 1 further comprising
   a fuel cell for generating electrical energy from hydrogen and oxygen, and
   means to transport the hydrogen and oxygen from the anolyte electrolytic dehydrator to the fuel cell.

3. The system of claim 2 having means to transmit the electrical energy of the fuel cell to an input of the power source thereby reducing net electrical energy for operating the system.

* * * * *